United States Patent
Lee et al.

(10) Patent No.: US 7,729,282 B2
(45) Date of Patent: Jun. 1, 2010

(54) HOME NETWORK SYSTEM AND ITS CONFIGURATION SYSTEM

(75) Inventors: Koon-Seok Lee, Changwon-shi (KR); Seung-Myun Baek, Changwon-shi (KR); Hwan-Jong Choi, Busan (KR); Yong-Tae Kim, Gimhae-shi (KR); Feel-Young Koo, Busan (KR); Ja-In Koo, Jinju-shi (KR); Seong-Hwan Kang, Kyungsangnam-do (KR)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 10/558,429

(22) PCT Filed: Jul. 7, 2003

(86) PCT No.: PCT/KR03/01344

§ 371 (c)(1),
(2), (4) Date: Feb. 12, 2007

(87) PCT Pub. No.: WO2004/107658

PCT Pub. Date: Dec. 9, 2004

(65) Prior Publication Data

US 2007/0133569 A1   Jun. 14, 2007

(30) Foreign Application Priority Data

May 30, 2003   (KR) ................. 10-2003-0034962

(51) Int. Cl.
*H04L 12/28* (2006.01)
(52) U.S. Cl. ..................... 370/254; 370/252
(58) Field of Classification Search .......... 370/352.353, 370/401, 254.252; 709/223, 224, 203, 220, 709/225, 227, 229
See application file for complete search history.

(56) References Cited

U.S. PATENT DOCUMENTS 4,888,728 A   12/1989   Shirakawa et al.

(Continued)

FOREIGN PATENT DOCUMENTS

EP   1115263 A1   7/2001

OTHER PUBLICATIONS

Simon Baatz, et al., "Handoff Support for Mobility with IP over Bluetooth," In: Local Computer Networks, 2000, LCN 2000, Proceedings 25th Annual IEEE Conference on Nov. 8-10, 2000, pp. 143-154.

(Continued)

*Primary Examiner*—Ayaz R Sheikh
*Assistant Examiner*—Chuong T Ho
(74) *Attorney, Agent, or Firm*—McKenna Long & Aldridge LLP (57) ABSTRACT

The present invention discloses a configuration apparatus thereof which can efficiently configure a new home appliance in the home network system comprised of various home appliances. The configuration method of a home network system, comprising of confirming whether a previously-stored logical address is an initial logical address, transmitting a master search packet to the home network system when the logical address previously stored in the storage means is an initial logical address, waiting for a response packet from the home network system, when the response packet is received from the home network system, changing the initial logical address into a predetermined logical address according to reception of the response packet; and when the response packet is not received from the home network system, changing the previously-stored initial logical address into a previously-stored basic logical address.

11 Claims, 5 Drawing Sheets

U.S. PATENT DOCUMENTS

| | | | |
|---|---|---|---|
| 4,980,913 | A | 12/1990 | Skret |
| 5,268,666 | A | 12/1993 | Michel et al. |
| 5,519,858 | A | 5/1996 | Walton et al. |
| 5,867,666 | A | 2/1999 | Harvey |
| 6,006,272 | A | 12/1999 | Aravamudan et al. |
| 6,160,808 | A | 12/2000 | Maurya |
| 6,233,248 | B1 | 5/2001 | Sautter et al. |
| 6,366,583 | B2 | 4/2002 | Rowett et al. |
| 6,415,313 | B1 | 7/2002 | Yamada et al. |
| 6,453,687 | B2 | 9/2002 | Sharood et al. |
| 6,507,953 | B1 | 1/2003 | Horlander et al. |
| 6,618,764 | B1 * | 9/2003 | Shteyn ............... 709/249 |
| 6,735,619 | B1 | 5/2004 | Sawada |
| 6,759,946 | B2 | 7/2004 | Sahinoglu et al. |
| 6,842,430 | B1 * | 1/2005 | Melnik ............... 370/254 |
| 6,856,999 | B2 * | 2/2005 | Flanagin et al. ......... 707/103 Y |
| 6,982,960 | B2 * | 1/2006 | Lee et al. ............... 370/254 |
| 6,987,462 | B2 | 1/2006 | Bae et al. |
| 7,028,312 | B1 | 4/2006 | Merrick et al. |
| 7,062,531 | B2 | 6/2006 | Kim |
| 7,069,091 | B2 | 6/2006 | Williamson |
| 7,103,834 | B1 | 9/2006 | Humpleman et al. |
| 7,149,792 | B1 * | 12/2006 | Hansen et al. ............... 709/220 |
| 7,200,683 | B1 | 4/2007 | Wang et al. |
| 7,257,104 | B2 | 8/2007 | Shitama |
| 7,287,062 | B2 * | 10/2007 | Im et al. ............... 709/213 |
| 7,353,259 | B1 | 4/2008 | Bakke et al. |
| 7,389,332 | B1 | 6/2008 | Muchow et al. |
| 7,389,358 | B1 | 6/2008 | Matthews et al. |
| 7,412,538 | B1 * | 8/2008 | Eytchison et al. ........... 709/245 |
| 7,421,478 | B1 | 9/2008 | Muchow |
| 7,430,591 | B2 * | 9/2008 | Chamberlain ............... 709/220 |
| 7,454,517 | B2 | 11/2008 | Ha et al. |
| 7,461,164 | B2 | 12/2008 | Edwards et al. |
| 2002/0011923 | A1 | 1/2002 | Cunningham et al. |
| 2002/0038358 | A1 | 3/2002 | Sweatt, III et al. |
| 2002/0059617 | A1 | 5/2002 | Terakado et al. |
| 2002/0072356 | A1 | 6/2002 | Yamashita et al. |
| 2002/0103898 | A1 | 8/2002 | Moyer et al. |
| 2003/0009537 | A1 | 1/2003 | Wang |
| 2003/0014630 | A1 | 1/2003 | Spencer et al. |
| 2003/0038730 | A1 | 2/2003 | Imafuku et al. |
| 2003/0065824 | A1 | 4/2003 | Kudo |
| 2003/0079000 | A1 | 4/2003 | Chamberlain |
| 2003/0079001 | A1 * | 4/2003 | Chamberlain ............... 709/220 |
| 2003/0083758 | A1 | 5/2003 | Williamson |
| 2003/0085795 | A1 | 5/2003 | An |
| 2003/0088703 | A1 | 5/2003 | Kim |
| 2004/0111490 | A1 * | 6/2004 | Im et al. ............... 709/218 |
| 2004/0158333 | A1 | 8/2004 | Ha et al. |
| 2005/0108568 | A1 * | 5/2005 | Bussiere et al. ............. 713/201 |
| 2005/0190727 | A1 | 9/2005 | Vanlieshout et al. |
| 2006/0248518 | A1 * | 11/2006 | Kundert ............... 717/140 |
| 2007/0019615 | A1 | 1/2007 | Baek et al. |
| 2007/0025368 | A1 | 2/2007 | Ha et al. |
| 2008/0255692 | A1 | 10/2008 | Hofrichter et al. |

OTHER PUBLICATIONS

Jukka Manner, et al., "Evaluation of Mobility and Quality of Service Interaction," In: Computer Networks, vol. 38, Issue 2, Feb. 5, 2002, Elsevier Science Publishers B.V., Amsterdam, NL pp. 137-163.

Kim, S., et al., Home Networking Digital TV Based on LnCP, Seoul, Korea, IEEE Transactions on Consumer Electronics, vol. 48, No. 4, Nov. 2002, pp. 990-996.

Lee, K.S., et al., A New Control Protocol for Home Appliances—LnCP, Digital Appliance Research Lab., Pusan, Korea, IEEE, 2001, pp. 286-291.

Simon Baatz, et al., "Handoff Support for Mobility with IP over Bluetooth," Univ. of Bonn, Institute of Computer Science IV, (2000 IEEE), pp. 143-154.

Lee et al., "A New Home Network Protocol for Controlling and Monitoring Home Appliances-HNCP", IEEE, 2002, p. 312-313.

Wang et al., "Towards Dependable Home Networking: An Experience Report", IEEE, 2000, pp. 43-48.

\* cited by examiner

HOME NETWORK SYSTEM AND ITS CONFIGURATION SYSTEM

This application claims the benefit of Korean Patent Application No. 2003-0034962, filed on May 30, 2003 and PCT Application No. PCT/KR2003/001344, filed on Jul. 7, 2003, which are hereby incorporated by reference for all purposes as if fully set forth herein.

TECHNICAL FIELD

The present invention relates to a home network system and a configuration apparatus thereof, and more particularly to, a home network system and a configuration apparatus thereof which can efficiently configure a new home appliance in the home network system comprised of various home appliances.

BACKGROUND ART

Home automation for automatically controlling home appliances at home or remotely has almost reached a commercial use stage. At its early stage, the home automation separately controlled each home appliance by using a telephone or infrared rays, and did not connect the home appliances. However, there has been suggested a method for building a network of home appliances by using a communication means, and collectively managing the network by using a controller.

Figure 1:
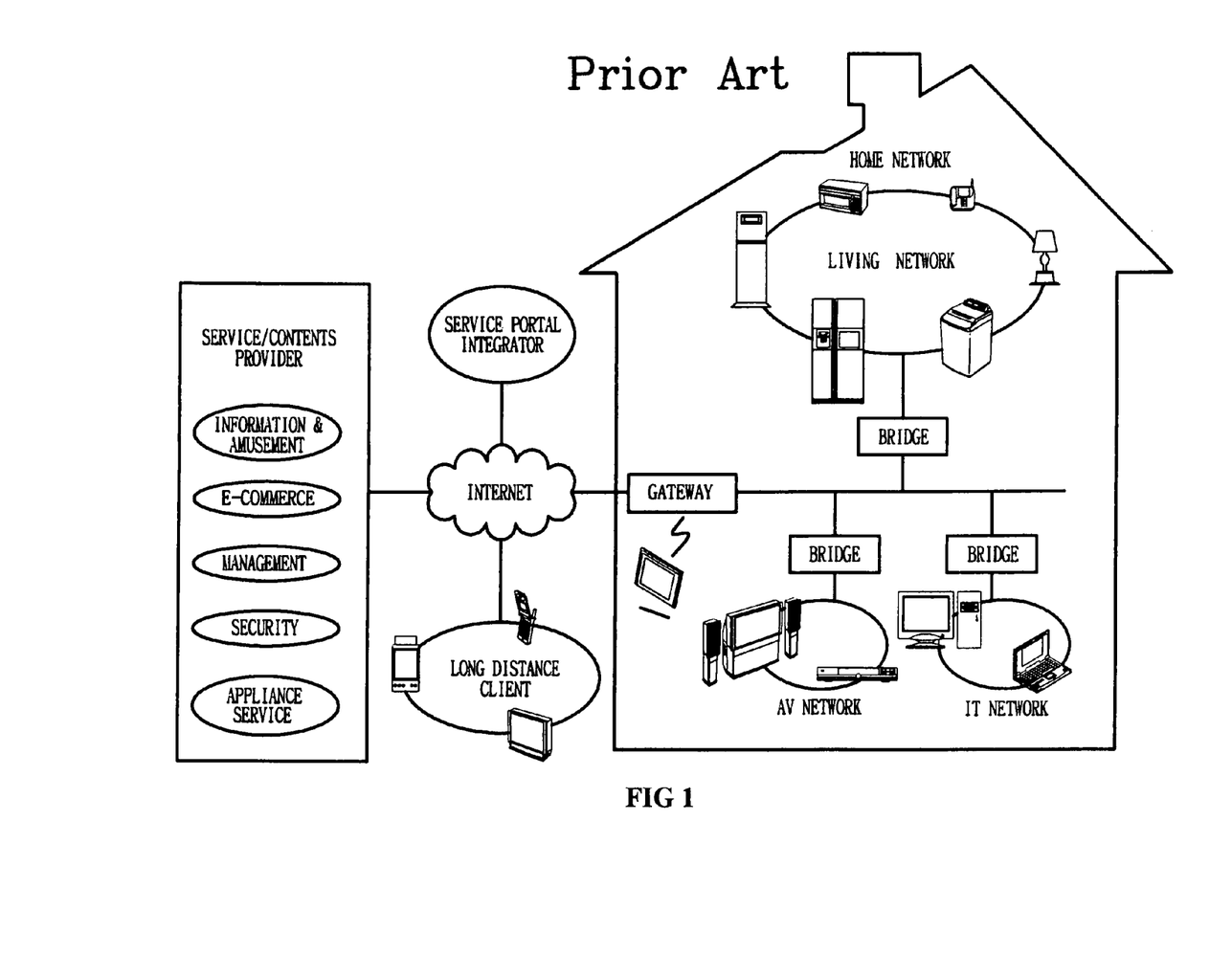
FIG. 1 is a structure view illustrating a general home network system.

FIG. 1 is a structure view illustrating a general home network system. Referring to FIG. 1, a home network connects various digital home appliances so that a user can always enjoy convenient, safe and economic life services inside or outside the house.

As factors of the advent of the home network, refrigerators or washing machines called white home appliances have been gradually digitalized due to development of digital signal processing techniques, and new information home appliances have been made due to rapid development of home appliance operating system techniques and high speed multimedia communication techniques.

Here, an IT network is built to exchange data between a personal computer and peripheral devices or provide Internet services, and an AV network is built between home appliances using audio or video information. In addition, a living network is built to simply control home appliances, such as home automation or remote meter reading, and may be comprised of a refrigerator, washing machine, microwave oven, electric lamp, gas alarm, air conditioner and telephone.

The home network system includes a master device which is a home appliance for controlling an operation of the other home appliances or monitoring a status thereof, and a slave device which is a home appliance having a function of responding to the request of the master device and a function of notifying a status change according to properties of the home appliances or other factors. Here, the home appliances include home appliances for the living network service such as a washing machine and a refrigerator as well as home appliances for the IT network service and the AV network service.

However, there has never been suggested an apparatus for efficiently configuring a new master device in the home network system, when the master device is firstly configured (connected) or another master device is configured in addition to the existing master device.

DISCLOSURE OF THE INVENTION

An object of the present invention is to provide a home network system and a configuration apparatus thereof which can efficiently configure a new master device when the master device is firstly configured in the existing home network system, or when the master device is configured in the home network system in which at least one master device has already been configured.

Another object of the present invention is to provide a synchronization apparatus and method of a home network system which can synchronize information between a plurality of master devices in the home network system including the plurality of master devices configured by the configuration apparatus.

In order to achieve the above-described objects of the invention, there is provided a home network system including: at least one slave device; and a plurality of master devices connected to the slave device through a predetermined network, wherein at least one master device includes a master means for controlling an operation of the slave device and monitoring a status thereof, and a slave means for responding to the request of the other master devices.

Preferably, the master means and the slave means are logically independent.

Preferably, the slave means notifies status change information of the master device to the other master devices.

According to another aspect of the invention, a configuration apparatus of a home network system includes: an interface means connected to the home network system; a storage means for storing a logical address; and a master means for confirming whether the logical address previously stored in the storage means is an initial logical address, generating a master search packet according to the confirm result, transmitting the master search packet to the home network system through the interface means, waiting for a response packet from the home network system, and changing the initial logical address into a predetermined logical address according to reception of the response packet.

Preferably, the master means repeats the procedure of transmitting the master search packet and waiting for the response packet by a predetermined number.

Preferably, the configuration apparatus further includes a slave means for generating a plugged-in notification packet, transmitting the plugged-in notification packet to the home network system, receiving an address setting packet from the home network system, changing the initial logical address into a new logical address included in the address setting packet, and transmitting an address setting ACK packet to the home network system, when receiving the response packet from the home network system.

Preferably, the slave means transmits an event notification packet for the changed logical address to a master group of the home network system.

Preferably, the master group includes a network manager.

Preferably, the master means transmits a request packet for requesting information of the whole home network system to the network manager, and receives and stores a response packet containing the information.

Preferably, the master means and the slave means are logically independent.

Preferably, when the master means does not receive the response packet from the home network system, the master means changes the previously-stored initial logical address into a basic logical address previously stored in a memory.

According to another aspect of the invention, a configuration method of a home network system includes the steps of: confirming whether a previously-stored logical address is an initial logical address through the home network system; transmitting a master search packet to the home network system according to the confirm result; waiting for a response packet from the home network system; and changing the initial logical address into a predetermined logical address according to reception of the response packet.

Preferably, the configuration method repeats the step for transmitting the master search packet and the step for waiting for the response packet by a predetermined number.

Preferably, when the response packet is received from the home network system, the change step includes the steps of: transmitting a plugged-in notification packet to the home network system; receiving an address setting packet from the home network system; changing the initial logical address into a new logical address included in the address setting packet; and transmitting an address setting ACK packet to the home network system.

Preferably, the configuration method further includes a step for transmitting an event notification packet for the changed logical address to a master group of the home network system.

Preferably, the master group includes a network manager.

Preferably, the configuration method further includes the steps of: transmitting a request packet for requesting information of the whole home network system to the network manager; receiving a response packet containing the information; and storing the information.

Preferably, when the response packet is not received from the home network system, the change step includes a step for changing the previously-stored initial logical address into a previously-stored basic logical address.

According to another aspect of the invention, a program storage medium stores a computer readable program which is provided to a master device connected to a home network system, and which includes the steps of: confirming whether a previously-stored logical address is an initial logical address through the home network system; transmitting a master search packet to the home network system according to the confirm result; waiting for a response packet from the home network system; and changing the initial logical address into a predetermined logical address according to reception of the response packet.

Preferably, the program further includes a step for repeating the procedure of transmitting the master search packet and waiting for the response packet by a predetermined number.

Preferably, when the response packet is received from the home network system, the change step includes the steps of: transmitting a plugged-in notification packet to the home network system; receiving an address setting packet from the home network system; changing the initial logical address into a new logical address included in the address setting packet; and transmitting an address setting ACK packet to the home network system.

Preferably, the program further includes a step for transmitting an event notification packet for the changed logical address to a master group of the home network system.

Preferably, the master group includes a network manager.

Preferably, the program further includes the steps of: transmitting a request packet for requesting information of the whole home network system to the network manager; receiving a response packet containing the information; and storing the information.

Preferably, when the response packet is not received from the home network system, the change step includes a step for changing the previously-stored initial logical address into a previously-stored basic logical address.

According to another aspect of the invention, a synchronization apparatus of a home network system is installed in each master device of the home network system including a plurality of master devices and a plurality of slave devices registered in each master device, and includes: an interface means connected to the home network system; a storage means for storing information relating to the whole slave devices; a master means for updating the information stored in the storage means and storing the updated information in the storage means according to change of the slave device of the home network system by the master device, receiving an event notification packet from the other master devices, updating the information of the slave device relating to the event notification packet, and storing the updated information in the storing means; and a slave means for generating an event notification packet relating to update of the information, and transmitting the event notification packet to the other master devices through the interface means.

Preferably, the change implies that a new slave device is registered in the master device.

Preferably, the event notification packet contains at least an address of the new slave device set by the master device.

Preferably, the change implies that the slave device registered in the master device is deleted.

Preferably, the event notification packet contains at least an address of the deleted slave device set by the master device, and the master means deletes the address of the slave device registered in the other master devices.

Preferably, the change implies a status change of the slave device.

According to another aspect of the invention, a synchronization method of a home network system including a plurality of master devices and a plurality of slave devices registered in each master device, includes the steps of: updating information according to changes relating to the slave devices registered in each master device; generating, at the master device, an event notification packet according to update of the information; transmitting the event notification packet from the master device to the other master devices; and updating, at the other master devices, the information relating to the slave device according to the event notification packet.

Preferably, the change implies that a new slave device is registered in the master device.

Preferably, the event notification packet contains at least an address of the new slave device set by the master device.

Preferably, the change implies that the slave device registered in the master device is deleted.

Preferably, the event notification packet contains at least an address of the deleted slave device set by the master device, and the other master devices delete the address of the slave device in the update step.

Preferably, the change implies a status change of the slave device.

BEST MODE FOR CARRYING OUT THE INVENTION

A home network system and a configuration apparatus thereof in accordance with the present invention will now be described in detail with reference to the accompanying drawings.

Figure 2A:
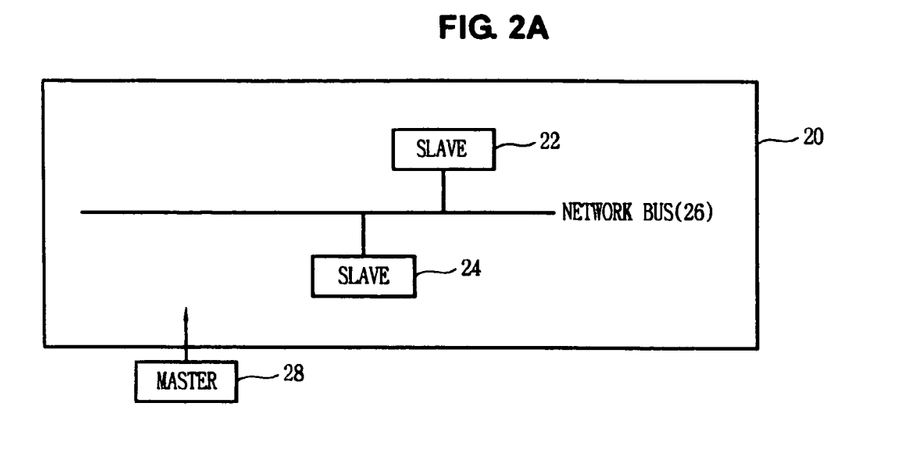
FIG. 2A is a status view illustrating first configuration of a master device in a home network system in accordance with the present invention.

FIG. 2A is a status view illustrating first configuration of a master device in the home network system in accordance with the present invention. Referring to FIG. 2A, the home network system 20 includes slave devices 22 and 24, and a network bus 26 for connecting the slave devices 22 and 24. A master device 28 is firstly connected to the home network system 20.

Figure 2B:
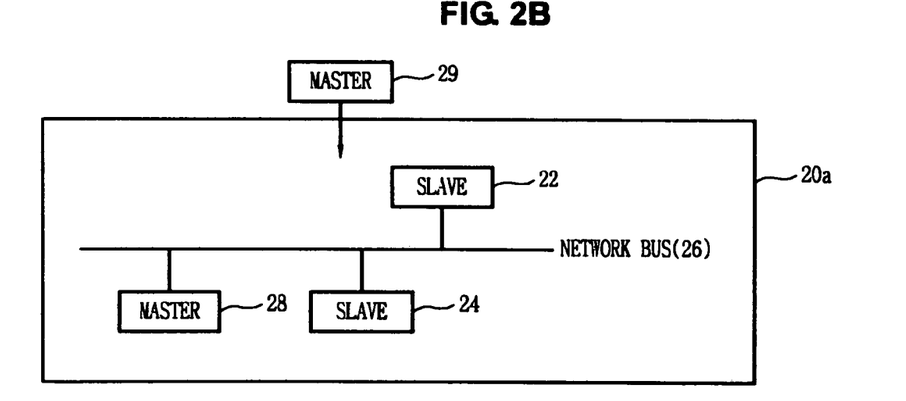
FIG. 2B is a status view illustrating additional configuration of a master device in the home network system of FIG. 2A.

FIG. 2B is a status view illustrating additional configuration of a master device in the home network system of FIG. 2A. As shown in FIG. 2A, the home network system 20a includes the slave devices 22 and 24 and the master device 28. Here, a new master device 29 is connected to the home network system 20a. The master device 28 may include a network manager for performing environment setting and resetting functions of the whole master and slave devices of the home network system 20a.

The newly-connected master devices 28 and 29 must have technical means and methods to be configured in the home network system 20 or 20a, which will be explained with reference to FIG. 3.

Figure 3:
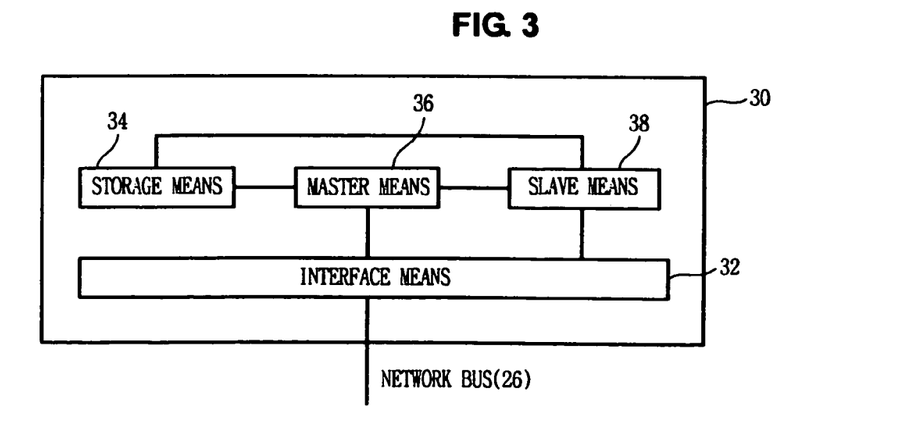
FIG. 3 is a structure view illustrating a master device including a configuration apparatus of the home network system in accordance with the present invention.

FIG. 3 is a structure view illustrating a master device including a configuration apparatus of the home network system in accordance with the present invention. As illustrated in FIG. 3, the master device 30 (same structure as master devices 28 and 29) includes an interface means 32 connected to the home network system 20, a storage means 34, a master means 36 for controlling an operation of the other master devices and/or slave devices or monitoring a status thereof, and a slave means 38 having a function of responding to the request of the other master devices, and a function of notifying a status change of the master device 30. Here, the master means 36 and the slave means 38 can be physically separated means (absolutely logically independent), or physically incorporated but logically independent means.

In more detail, the storage means 34 stores an initial logical address set in factory (for example, TV is set with 0x2100, 0x21 is a product code of TV, and 0x00 is an initial logical address), and also stores a basic logical address for any master device for the home network system 20 which the master device 30 is firstly configured in (connected to) (for example, TV is set with 0x2101, 0x21 is a product code of TV, and 0x01 is a basic logical address). In addition, the storage means 34 can store a logical address set by the home network system including another master device (for example, TV is set with 0x2104). Such logical addresses logically distinguish the master device 30 from the other home appliances. The storage means 34 additionally stores the information of the whole home network system 20 which the master device 30 is configured in (for example, information of other master devices, information of other slave devices, etc.).

After being connected to the home network system 20, the master means 36 performs the same functions as the general master device. When the master device is separately configured in the home network system 20, the master means 36 additionally performs functions for configuration, which will later be explained with reference to FIG. 4.

When the master device does not exist as in the home network system 20 (refer to FIG. 2A), the slave means 38 is not active. When the master device exists as in the home network system 20a (refer to FIG. 2B), the slave means 38 provides status change information to the other master devices, or performs an operation according to a control command from the other master devices like the general slave device. Therefore, the information of the home network system 20a is maintained identically in the whole master devices, so that the user can be provided with accurate information. In addition, when the master device 30 is configured in the home network system 20a, the slave means 38 additionally performs functions for configuration, which will be explained with reference to FIG. 4.

Figure 4:
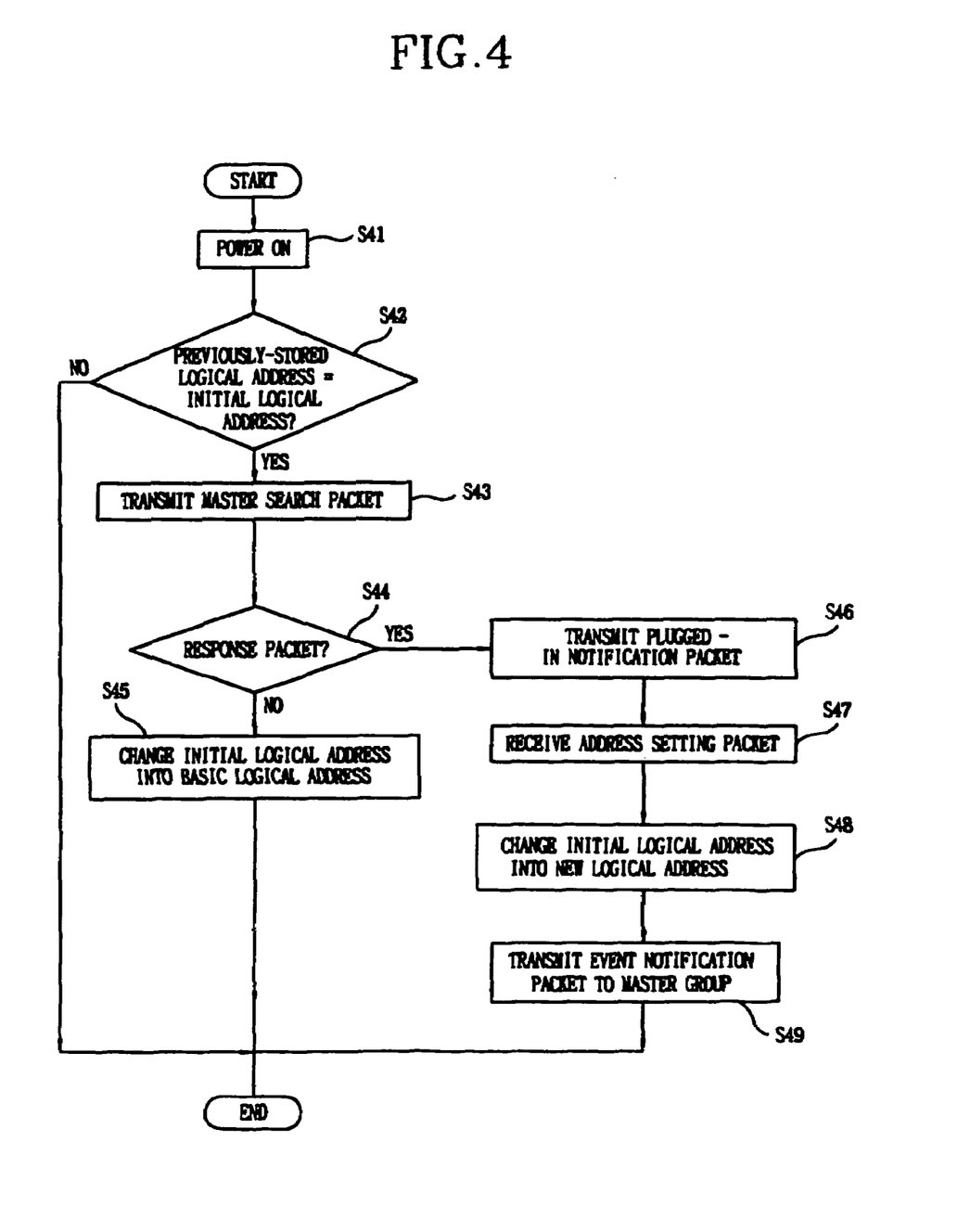
FIG. 4 is a flowchart showing sequential steps of a configuration method of the home network system in accordance with a first embodiment of the present invention.

FIG. 4 is a flowchart showing sequential steps of the configuration method of the home network system in accordance with a first embodiment of the present invention.

The configuration method includes a step (S41) for connecting the master device 30 to the home network system 20 or 20a and turning on the master device 30, a step (S42) for comparing a previously-stored logical address with an initial logical address, a step (S43) for transmitting a master search packet to the home network system 20 or 20a, a step (S44) for receiving a response packet to the master search packet from the home network system 20 or 20a, a step (S45) for changing the initial logical address into a basic logical address, when the response packet is not received, a step (S46) for transmitting a plugged-in notification packet to the home network system 20a, when the response packet is received, a step (S47) for receiving an address setting packet from the home network system 20a, a step (S48) for changing the initial logical address into a new logical address, and a step (S49) for transmitting an event notification packet to the master group of the home network system 20a.

In detail, in S42, the master means 36 of the master device 30 reads the logical address stored in the storage means 34, compares the logical address with the initial logical address (for example, 0x00), and decides whether the master device 30 has already been configured in the home network system 20 or 20a. When the stored logical address is not the initial logical address, the master means 36 decides that the master device 30 has been configured in the home network system 20 or 20a, and ends the routine. If the stored logical address is the initial logical address, the master means 36 performs the steps for configuring the master device 30 in the home network system 20 or 20a.

In S43, the master means 36 transmits the master search packet for searching master devices configured in the home network system 20 or 20a through the interface means 32.

In S44, when the master means 36 does not receive the response packet as in the home network system 20, the master means 36 changes the initial logical address previously stored in the storage means 34 into the basic logical address, stores the basic logical address, and ends the routine (S45). When the master means 36 receives the response packet as in the home network system 20a, the routine goes to S46.

In S46, the master means 36 transmits the response packet to the slave means 38, and the slave means 38 transmits the plugged-in notification packet to the home network system 20a to request a new logical address to the home network system 20a (more specifically, other master devices configured in the home network system 20a). Upon the request, at least one master device of the home network system 20a sets the logical address for distinguishing the new master device 30, generates the address setting packet containing the logical address, and transmits the address setting packet to the master device 30.

Here, the slave means 38 can continuously transmit the plugged-in notification packet at an interval of a predetermined time.

In S47, the slave means 38 receives the address setting packet containing the new logical address for the master device 30 from the home network system 20a.

In S48, the slave means 38 changes the initial logical address previously stored in the storage means 34 into a new logical address, stores the new logical address, and transmits an address setting ACK packet to the home network system 20a.

In S49, the slave means 38 transmits the event notification packet containing the new logical address to the master group (all master devices of the home network system 20a. It is similar to status change notification of the general slave device.

Figure 5:
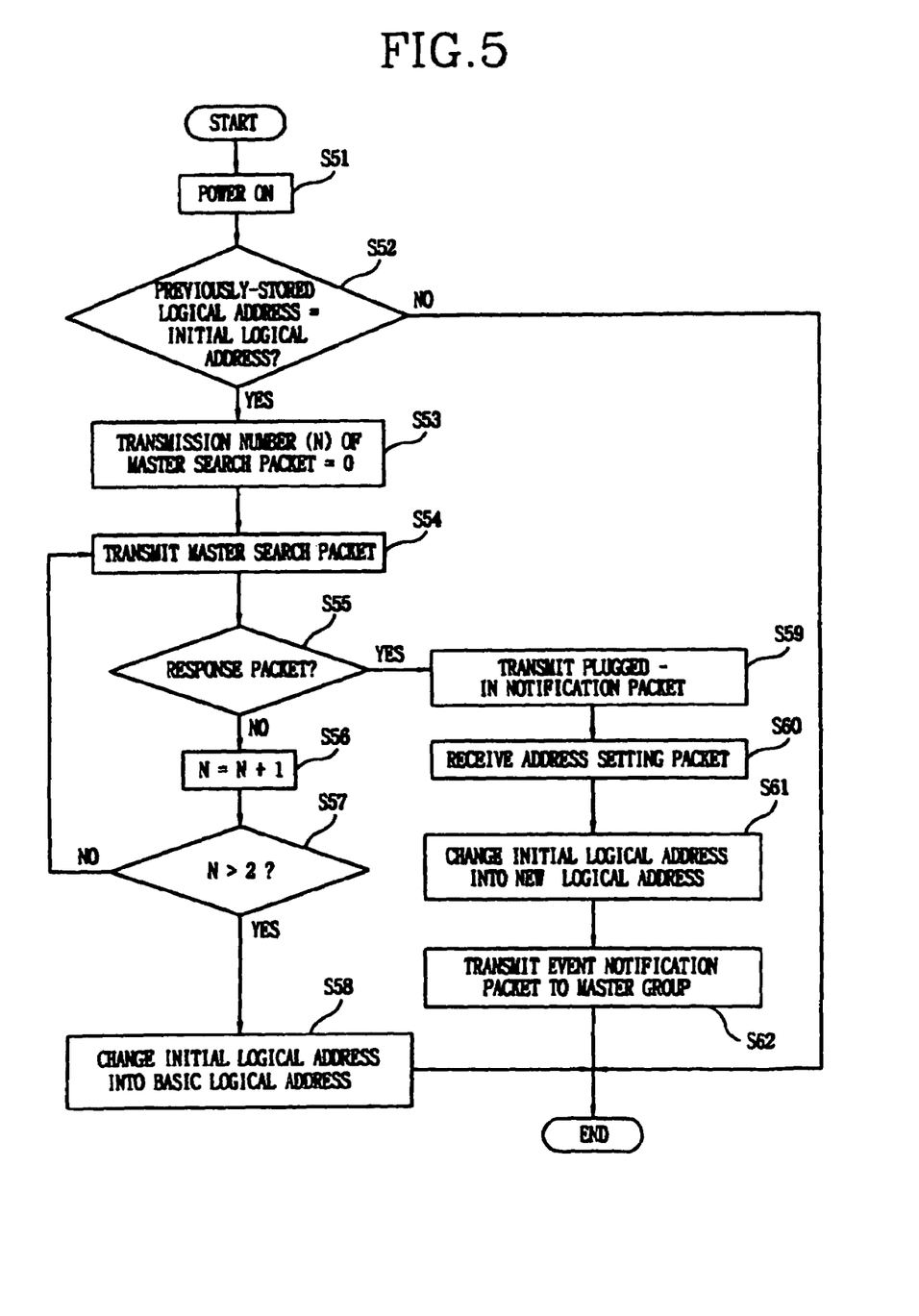
FIG. 5 is a flowchart showing sequential steps of a configuration method of the home network system in accordance with a second embodiment of the present invention.

FIG. 5 is a flowchart showing sequential steps of a configuration method of the home network system in accordance with a second embodiment of the present invention.

The configuration method includes a step (S51) for connecting the master device 30 to the home network system 20 or 20a and turning on the master device 30, a step (S52) for comparing a previously-stored logical address with an initial logical address, a step (S53) for setting a transmission number N of a master search packet as '0', a step (S54) for transmitting the master search packet to the home network system 20 or 20a, a step (S55) for receiving a response packet to the master search packet from the home network system 20 or 20a, a step (S56) for increasing the transmission number N of the master search packet by '1', when the response packet is not received, a step (S57) for deciding whether the transmission number N of the master search packet is greater than '2', a step (S58) for changing the initial logical address into a basic logical address, when the transmission number N of the master search packet is greater than '2', a step (S59) for transmitting a plugged-in notification packet to the home network system 20a, when the response packet is received, a step (S60) for receiving an address setting packet from the home network system 20a, a step (S61) for changing the initial logical address into a new logical address, and a step (S62) for transmitting an event notification packet to the master group of the home network system 20a.

Here, steps S53, S56 and S57 are newly added to the configuration method of FIG. 4. After the master means 36 sets the transmission number N of the master search packet as '0' and transmits the master search packet, if the master means 36 does not receive the response packet from the home network system 20 or 20a, the master means 36 sets the transmission number N as '1' and transmits the master search packet again according to the decision result of S57. That is, the master search packet is repeatedly transmitted by a predetermined number (here, three times), to prevent non search of other master devices due to errors of the network bus 26 or master devices of the home network system 20 or 20a.

In accordance with the configuration methods of FIGS. 4 and 5, the master means 36 of the master device 30 connected to and configured in the home network system 20a can transmit a request packet for requesting information of the whole home network system 20a to the other master devices including the network manager, receive a response packet to the request packet, and store the information of the response packet in the storage means 34.

In addition, in accordance with the configuration methods of FIGS. 4 and 5, when the master device 30 is connected to and configured in the home network system 20a, if another master device requests its product information, the slave means 38 can transmit the information of the master device 30 to another master device, or the master device 30 itself can transmit its information to the master group.

Such configuration methods can be made in the form of a program, stored in a storage means of a master device connected to and configured in the home network system, and executed when the master device is connected to the home network system and turned on.

Figure 6:
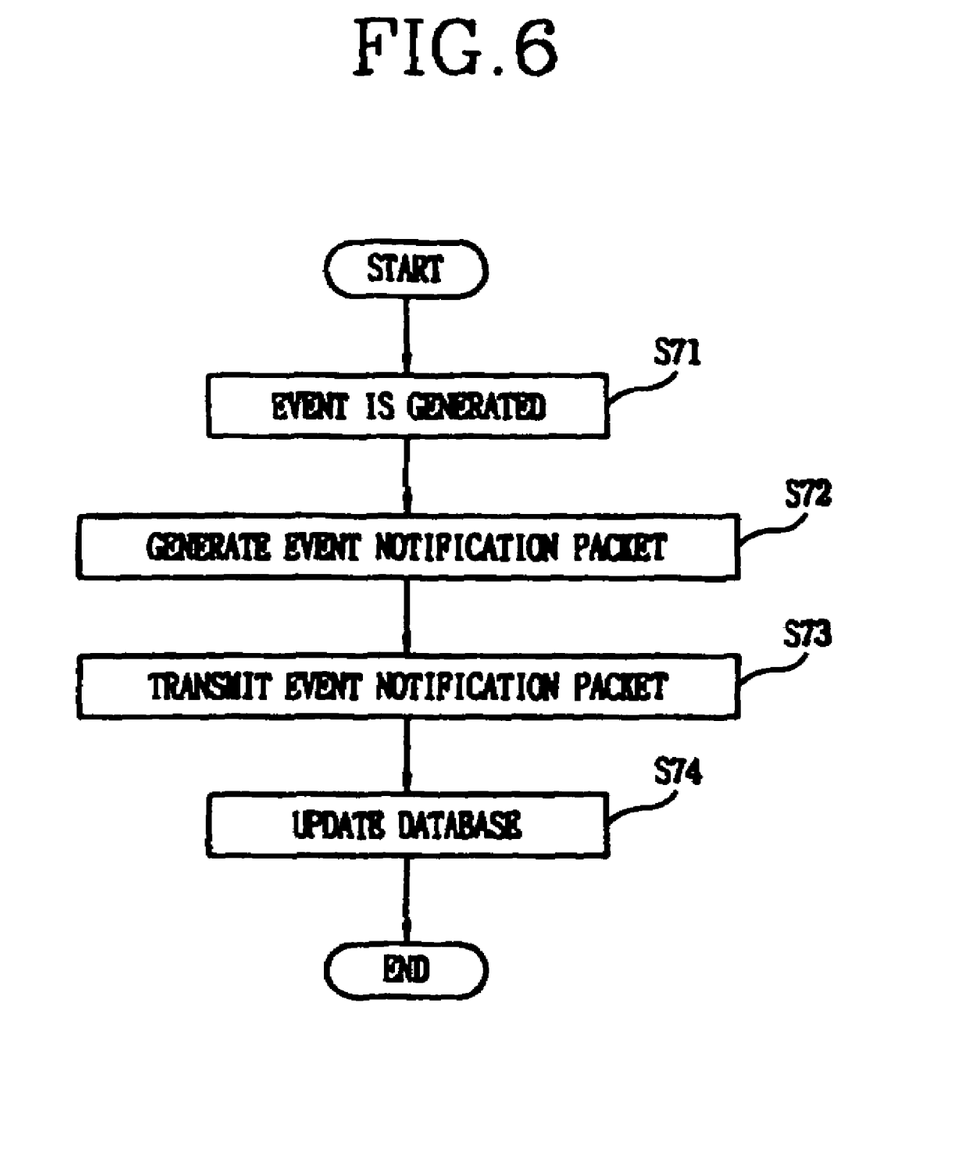
FIG. 6 is a flowchart showing sequential steps of a synchronization method of the home network system in accordance with the present invention.

FIG. 6 is a flowchart showing sequential steps of a synchronization method of the home network system in accordance with the present invention.

In the home network system 20a including a plurality of master devices 30, the synchronization method includes a step (S71) which an event relating to a slave device configured in the home network system 20a by one master device 30 is generated, a step (S72) for generating an event notification packet at the master device 30, a step (S73) for transmitting the event notification packet to the other master devices, and a step (S74) for updating information of the slave device according to the event notification packet.

In detail, in S71, the slave device is configured in the home network system 20 including the plurality of master devices 30 by the specific master device 30, is provided with a logical address or position code (for distinguishing a specific position of house) from the master device 30, and transmits its product information to the master device 30. Here, when the master device 30 stores the information of the new slave device in a storage means 34 and thus the information of the storage means 34 is changed, when the slave device configured in the home network system 20a by the master device 30 is deleted and thus the information of the storage means 34 is changed, or when a status of the slave device is changed (for example, position change) and thus the information of the storage means 34 is changed, corresponding events are generated.

In S72, a slave means 38 generates the event notification packet for notifying information change. Here, the event notification packet includes the address (logical address and/or position code) of the slave device relating to the event.

In S73, the slave means 38 transmits the event notification packet to the master group and/or other master devices through an interface means 32. In S74, the master devices receiving the event notification packet update the previously-stored information of the slave device according to the event notification packet.

In accordance with the synchronization process, the information of the slave device configured in the home network system 20a by the specific master device 30 is identically changed and updated in the other master devices, so that the user can obtain the information of the slave device.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A configuration apparatus of a home network system, comprising:

an interface means connected to the home network system;

a storage means for storing a logical address; and a master means for confirming whether the logical address previously stored in the storage means is an initial logical address, generating a master search packet when the logical address previously stored in the storage means is an initial logical address, transmitting a master search packet to the home network system through the interface means, waiting for a response packet from the home network system, when the response packet is received from the network system, changing the initial logical address previously stored in the storage means into a predetermined logical address included in according to reception of the response packet, and when the response packet is not received from the network system, incrementing a counter value from a first value to a second value, greater than the first, the counter value representing a transmission number of the master packet, determining if the incremented counter value is greater than a preset value, and changing the logical address previously stored in the storage means into a basic logical address, and if the incremented counter value is not greater than the preset value, returning to the transmitting the master search packet to the network system.

2. The apparatus of claim 1, further comprising a slave means for generating a plugged-in notification packet, transmitting the plugged-in notification packet to the network system, receiving an address setting packet from the network system, changing the logical address previously stored in the storage means into a new logical address included in the address setting packet, and transmitting an address setting ACK packet to the network system, when receiving the response packet from the network system.

3. The apparatus of claim 2, wherein the slave means transmits an event notification packet for the changed logical address to a master group of the network system.

4. The apparatus of claim 3, wherein the master group comprises a network manager.

5. The apparatus of claim 4, wherein the master means transmits a request packet for requesting information of the whole network system to the network manager, and receives and stores a response packet containing the information.

6. The apparatus of claim 2, wherein the master means and the slave means are logically independent.

7. A configuration method of a device in a home network system, comprising the steps of:

confirming, at the device, whether a previously-stored logical address is an initial logical address;

transmitting a master search packet to the home network system when the previously-stored logical address previously is an initial logical address;

waiting for a response packet from the home network system;

when the response packet is received from the home network system, changing the previously-stored-logical address into a predetermined logical address included in according to reception of the response packet; and when the response packet is not received from the home network system, incrementing a counter value from a first value to a second value, greater than the first, the counter value representing a transmission number of the master packet, determining if the incremented counter value is greater than a preset value, and changing the previously-stored initial logical address into a basic logical address, and if the incremented counter value is not greater than the preset value, returning to the transmitting the master search packet to the network system.

8. The method of claim 7, wherein, when the response packet is received from the network system, the change step comprises the steps of:

transmitting a plugged-in notification packet to the network system;

receiving an address setting packet from the network system;

changing the previously-stored logical address into a new logical address included in the address setting packet; and transmitting an address setting ACK packet to the network system.

9. The method of claim 8, further comprising a step for transmitting an event notification packet for the changed logical address to a master group of the network system.

10. The method of claim 9, wherein the master group comprises a network manager.

11. The method of claim 10, further comprising the steps of:

transmitting a request packet for requesting information of the whole network system to the network manager;

receiving a response packet containing the information; and storing the information.

* * * * *